US007010587B1

(12) United States Patent
Shiimori (10) Patent No.: US 7,010,587 B1
(45) Date of Patent: Mar. 7, 2006

(54) DATA COMMUNICATION SYSTEM, AND SERVER AND CLIENT COMPUTER CONSTRUCTING SAID SYSTEM

(75) Inventor: Yoshiko Shiimori, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 711 days.

(21) Appl. No.: 09/641,730

(22) Filed: Aug. 21, 2000

(30) Foreign Application Priority Data

Aug. 20, 1999 (JP) ................................ 11-233328

(51) Int. Cl.
G06F 15/173 (2006.01)
G06F 15/167 (2006.01)
G06F 15/16 (2006.01)

(52) U.S. Cl. ...................... 709/223; 709/203; 709/212; 709/216; 715/526; 358/1.11; 358/1.15

(58) Field of Classification Search .............. 709/205, 709/237, 202, 219, 203, 213, 227, 223, 212, 709/216; 358/1.15, 1.11; 715/543, 529, 715/526

See application file for complete search history.

(56) References Cited

U.S. PATENT DOCUMENTS

| | | | |
|---|---|---|---|
| 5,233,685 A * | 8/1993 | Landes et al. ............... 715/542 |
| 5,367,618 A * | 11/1994 | Ishida ........................ 715/542 |
| 5,533,174 A * | 7/1996 | Flowers et al. ............. 358/1.15 |
| 5,781,714 A * | 7/1998 | Collins et al. .............. 345/471 |
| 5,859,648 A * | 1/1999 | Moore et al. ............... 345/471 |
| 6,065,008 A * | 5/2000 | Simon et al. ................. 707/10 |
| 6,073,147 A * | 6/2000 | Chan et al. ................. 715/542 |
| 6,111,654 A * | 8/2000 | Cartier et al. .............. 358/1.16 |
| 6,256,650 B1 * | 7/2001 | Cedar et al. ................ 715/517 |
| 6,452,692 B1 * | 9/2002 | Yacoub ...................... 358/1.15 |
| 6,675,357 B1 * | 1/2004 | Carter et al. ................ 715/542 |

* cited by examiner

Primary Examiner—Saleh Najjar
Assistant Examiner—B R Bruckart
(74) Attorney, Agent, or Firm—McGinn IP Law Group, PLLC (57) ABSTRACT

An edited image is created using fonts capable of being employed by both a client computer and a server. To accomplish this, the user of the computer selects a service to be utilized. Client information, which includes the service selected, information relating to the operating system of the computer and information relating to fonts that can be utilized by the computer, is transmitted to the server. The latter creates a list of fonts that can be utilized by the computer and transmits the data of the created font list and editing home-page data to the computer. The user of the computer decides fonts to be used in the edited image from among the fonts that have been transmitted and edits the image by using these fonts. Information for editing is transmitted from the client computer to the server, where the edited image is then printed out.

28 Claims, 12 Drawing Sheets

```
CLIENT INFORMATION
    OS INFORMATION   : OS 1
    FONT INFORMATION : MS MINCHO
                      MS GOTHIC
                      DFP MARU GOTHIC LIGHT
                      DFP MARU GOTHIC MEDIUM
                      DFP SEMICURSIVE
                      DFP MARU CHARACTER TYPE
```

Fig. 6

```
FONT LIST
    MS MINCHO
    MS GOTHIC
    DFP SEMICURSIVE
```

DATA COMMUNICATION SYSTEM, AND SERVER AND CLIENT COMPUTER CONSTRUCTING SAID SYSTEM

BACKGROUND OF THE INVENTION

1. Field of the Invention

This invention relates to a system constructed by a client computer and server capable of communicating data with each other, the client computer and the server constructing this system, a method of controlling the server, and a recording medium storing a program for controlling the client computer.

2. Description of the Related Art

The building of networks has made it possible for a document (which may include images) to be created while a client computer and server communicate with each other. In a case where the client computer creates a document, fonts usable at the client computer are employed. When the operator of the server creates a document in accordance with a command from the user of the client computer, fonts usable at the server are employed.

In many instances the fonts usable at the client computer and the fonts usable at the server do not match. As a consequence, there are cases where a document created using a special font at the client computer cannot be created using this font at the server.

DISCLOSURE OF THE INVENTION

An object of the present invention is to employ fonts usable at both a client computer and server in a case where a document is created while data communication is performed between the client computer and the server.

A data communication system according to the present invention is constructed from a client computer and a server that are capable of communicating data with each other.

The client computer has a first font transmitting unit (first font transmitting means) for transmitting font information data representing fonts capable of being output at the client computer.

The server has a first receiving unit (first receiving means) for receiving the font information data that has been transmitted from the first font transmitting unit of the client computer; a font search unit (font search means) for searching for fonts, which are capable of being output at the client computer, from among fonts capable of being output at the server, on the basis of fonts represented by the font information data that has been received at the first receiving means; and a second font transmitting unit (second font transmitting means) for transmitting font information data representing the fonts, which have been found by the font search unit, to the client computer.

The present invention provides also a method of controlling the server. Specifically, the invention provides a method of controlling a server which communicates data with a client computer, the method comprising the steps of: receiving font information data that has been transmitted from the client computer and that represents fonts capable of being output at the client computer; searching for fonts, which are capable of being output at the client computer, from among fonts capable of being output at the server, on the basis of fonts represented by the font information data that has been received; and transmitting font information data representing the fonts that have been found to the client computer.

The present invention provides also a recording medium storing a program for controlling the client computer.

In accordance with the present invention, the font information data representing fonts capable of being output at the client computer is transmitted to the server.

The server receives the font information data and, on the basis of the fonts represented by this received font information data, searches for fonts capable of being output at the client computer among the fonts capable of being output at the server. Accordingly, fonts capable of being output at both the client computer and server are found.

The font information data representing the found fonts is transmitted from the server to the client computer.

By creating a document at the client computer using the fonts represented by the font information data that has been received, it is possible to create a document having fonts capable of being output at both the client computer and server.

Data representing the created document is transmitted from the client computer to the server and is printed by the server, by way of example. Since fonts capable of being output at both the client computer and server are being used, the fonts of the document output at the client computer and the fonts of the document output at the server are the same.

An arrangement may be adopted in which data representing the operating system of the client computer is transmitted to the server.

Even if the operating system of the client computer and the operating system of the server do not coincide, fonts usable at the client computer can be detected at the server.

An arrangement may be adopted in which the server reports, in association with an operating system, fonts capable of being output.

Preferably, the client computer selects the type of document to be created and sends selection data, which represents the type of document selected, to the server.

In this case, the document selection data that has been transmitted from the client computer would be received at the server and the fonts capable of being output at the client computer would be searched for at the server based upon the type of document represented by the received selection data and the fonts capable of being output at the client computer.

Thus, a document can be created using fonts suited to the type of document.

An arrangement may be adopted in which the server reports, in association with the type of document, the fonts capable of being output.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

Figure 1:
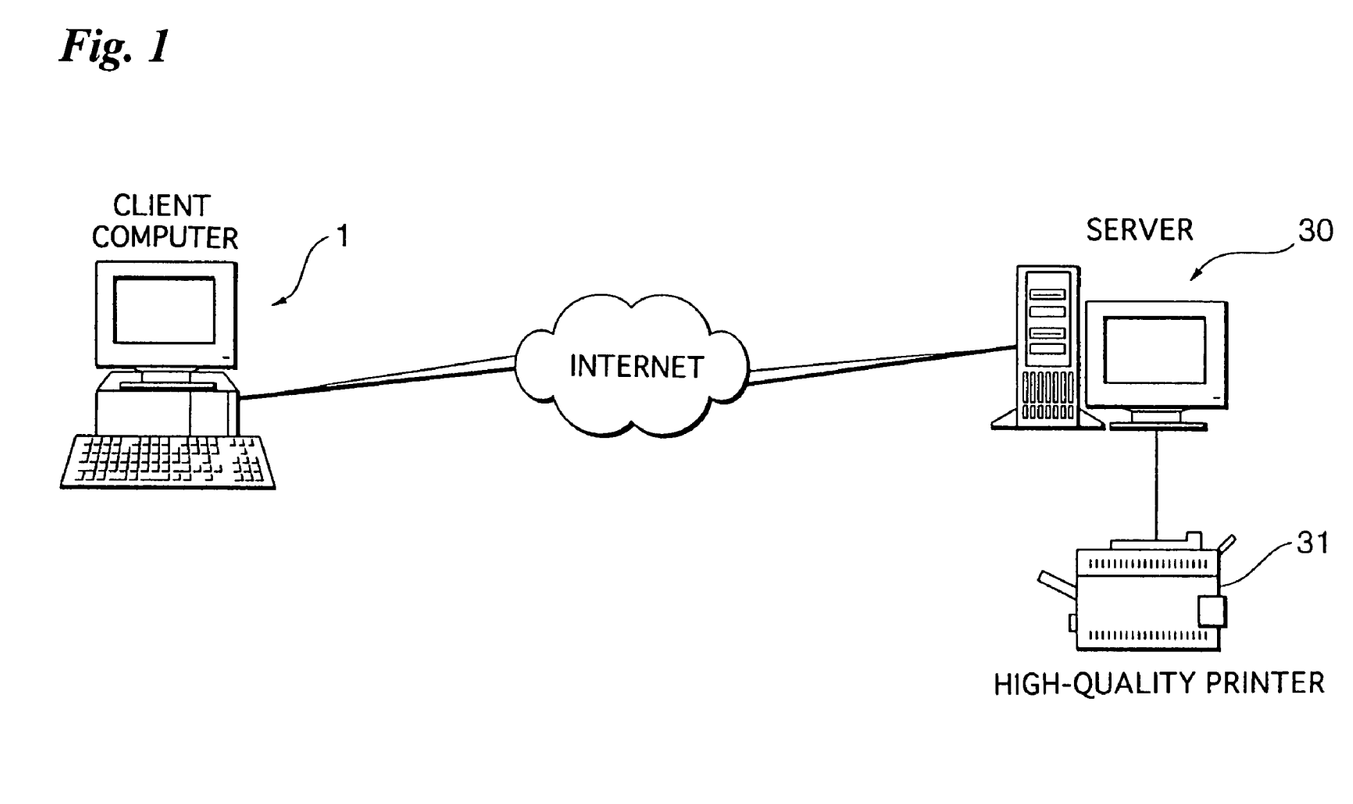
FIG. 1 illustrates the overall configuration of an image editing system according to a preferred embodiment of the present invention.

FIG. 1 illustrates the overall configuration of an image editing system according to an embodiment of the present invention.

As shown in FIG. 1, the image editing system is constructed by connecting a client computer 1 and a server 30 via the Internet. Though a number of the client computers 1 are connected to the server 30, only one is illustrated in FIG. 1.

A high-quality printer 31 capable of printing high-quality images is connected to the server 30.

The user of the client computer 1 edits images while communicating with the server 30.

In the image editing system according to this embodiment, the fonts of text inserted into an edited image make use of common fonts capable of being output at the client computer 1 and capable of being output at the server 30. Further, services for creating an edited image include services for creating postcards, business cards and posters, and suitable fonts are decided for each of the services. Fonts are also decided for each operating system (referred to as an "OS" below). Accordingly, the user of the client computer 1 creates text inserted into the edited image using fonts that are applicable to the selected service and to the OS of the client computer 1 from among fonts that have been stored at the server 30.

Figure 2:
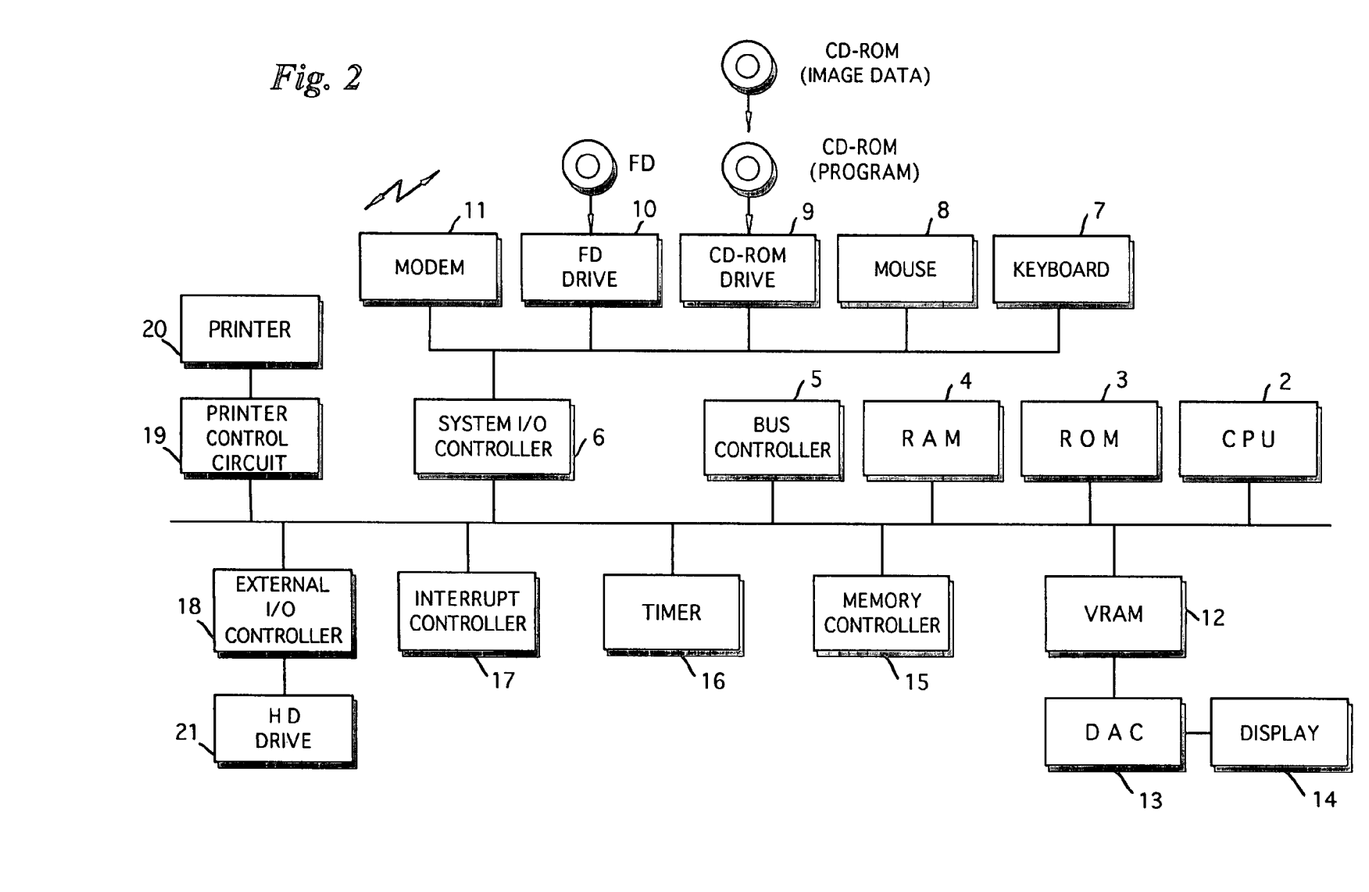
FIG. 2 is a block diagram illustrating the electrical construction of a client computer according to this embodiment.

FIG. 2 is a block diagram illustrating the electrical construction of the client computer 1.

The overall operation of the client computer 1 is controlled by a CPU 2.

The client computer 1 includes a ROM 3, a RAM 4 for storing data temporarily, a VRAM 12 for displaying an image on a display unit 14 in order to edit an image, and a memory controller 15 for controlling read-out of data from the ROM 3 as well as write and read-out of data to and from the RAM 4 and VRAM 12. The image data that has been read out of the VRAM 12 is applied to a DA converter 13, whereby the image data is converted to an analog video signal so that an image is displayed on the display unit 14.

A bus controller 5, memory controller 15 and timer 16 are connected to the client computer 1.

Furthermore, a system input/output controller 6 is connected to the client computer 1. Connected to the system I/O controller 6 are a keyboard 7 and mouse 8 for accepting operating commands from the user of the client computer 1, a CD-ROM (compact disk read-only memory) drive 9 and FD (floppy disk) drive 10 for reading image data and programs, etc., and a modem 11 for providing a connection to the Internet.

An external I/O controller 18 is connected to the client computer 1, and an HD (hard disk) drive 21 is connected to the external I/O controller 18. Write and read-out of data to and from an HD can be controlled by the HD drive 21. A program that has been stored on a CD-ROM is written to the HD. By reading out an execution program that has been written to the HD, predetermined processing (described later) can be executed by the client computer 1.

A printer 20 for printing an image and a printer control circuit 19 for controlling the printer 20 are connected to the client computer 1.

The server 30 also has a construction almost the same as that of the client computer 1 though it goes without saying that the server 30 generally has a performance that surpasses that of the client computer 1, such as a high-quality printer 31 connected thereto. Further, it goes without saying that by inserting a CD-ROM storing a program into the server 30, the program is read and the server 30 operates in accordance with the program.

Figure 3:
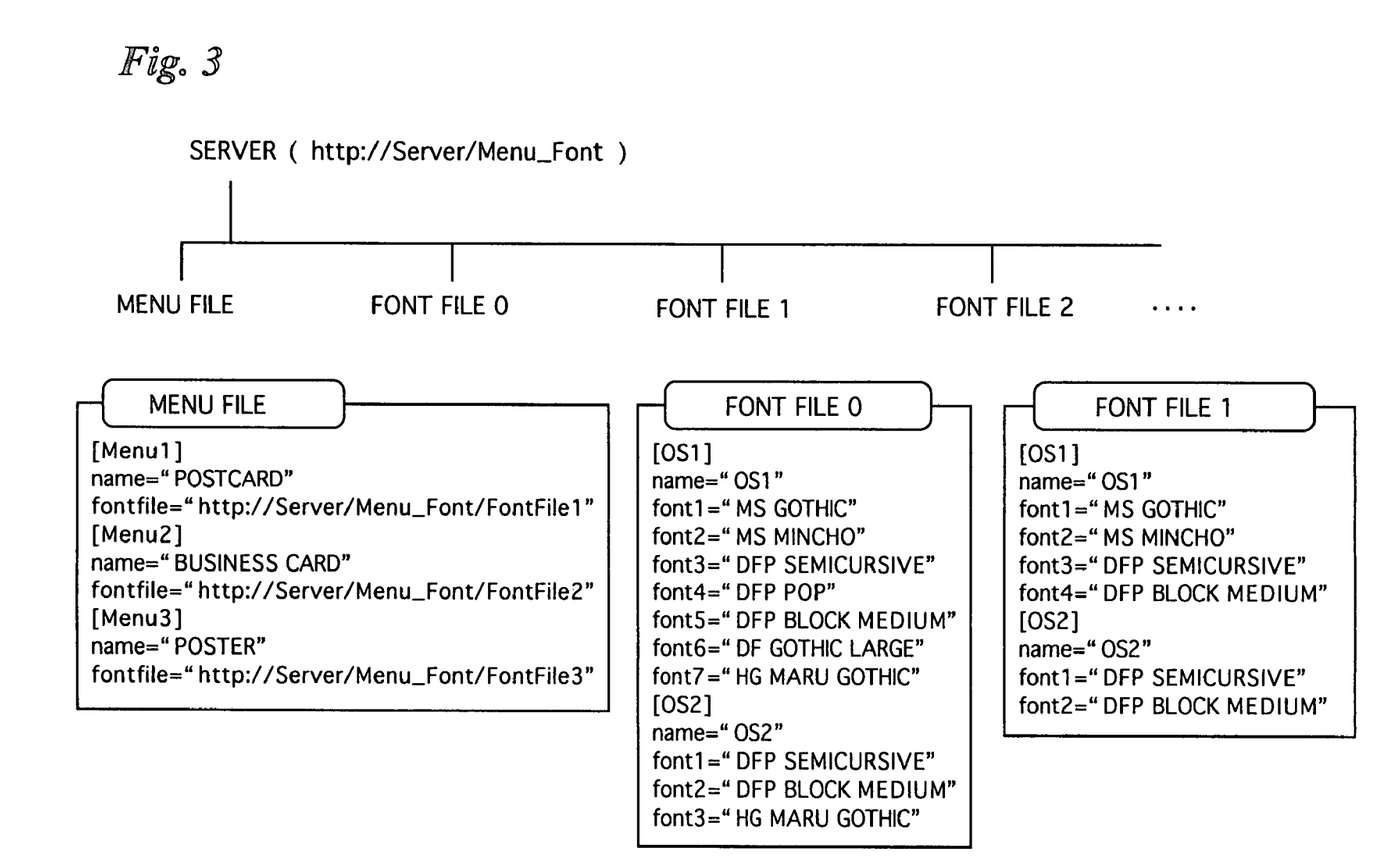
FIG. 3 illustrates a menu file and font files that have been stored in a server according to this embodiment.

FIG. 3 illustrates an example of files that have been stored on the hard disk of the server 30.

A menu file, a plurality of font files (Font Files 0, 1, 2 and 3) and other necessary files such as image files have been stored in the server 30.

Data representing all fonts that can be used at the server 30 has been stored in Font File 0 on a per-OS basis.

From among all fonts that can be used at the server 30, data representing fonts suited to services has been stored in the Font Files 1 to 3 on a per-service basis. From among all fonts that can be used at the server 30, data representing fonts preferred for use when a postcard is created has been stored in Font File 1 on a per-OS basis. From among all fonts that can be used at the server 30, data representing fonts preferred for use when a business card is created has been stored in Font File 2 on a per-OS basis. From among all fonts that can be used at the server 30, data representing fonts preferred for use when a poster is created has been stored in Font File 3 on a per-OS basis.

The menu file contains data indicating in which of the Font Files 1 to 3 a font suited to a service has been stored.

Figure 4:
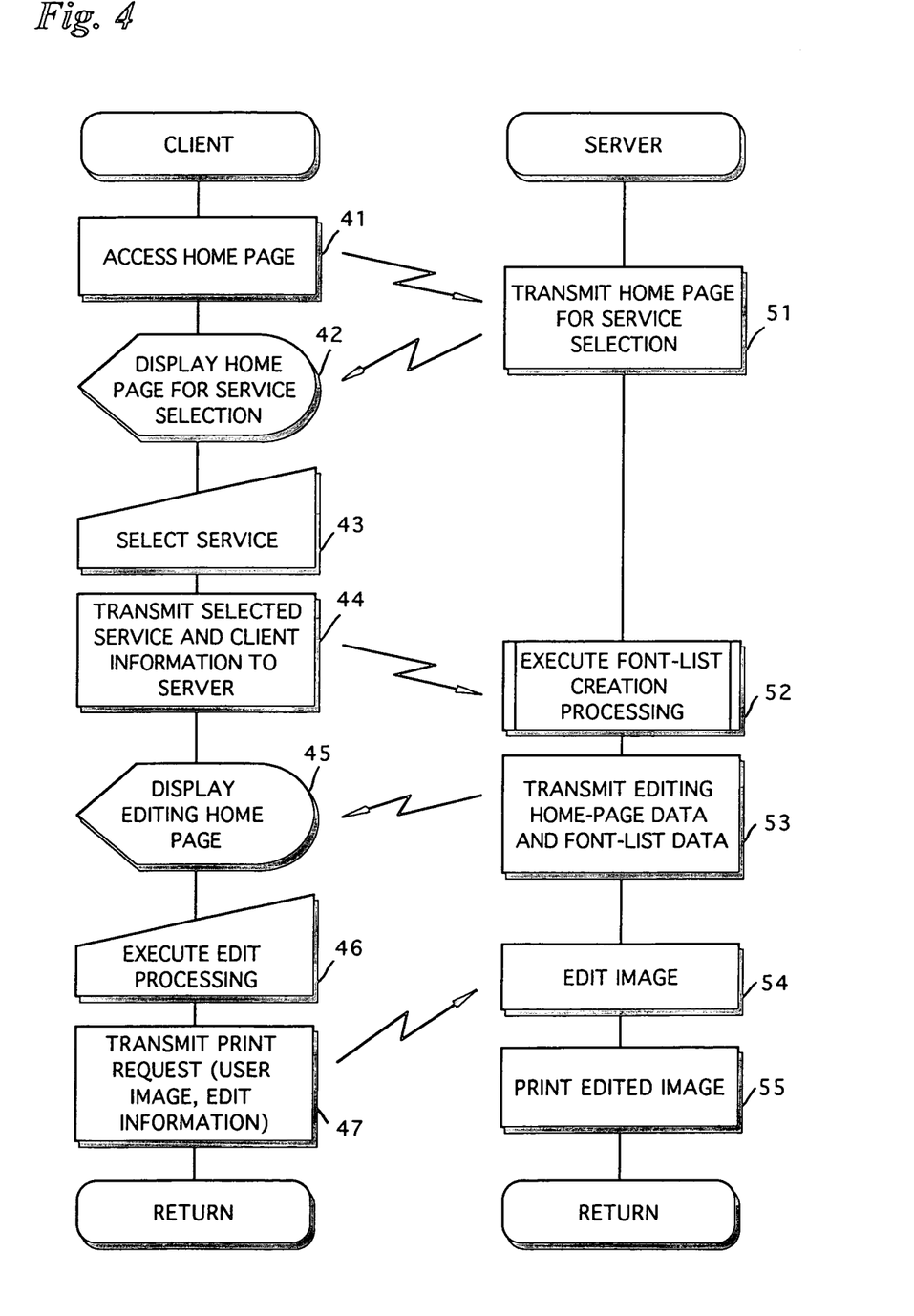
FIG. 4 is a flowchart illustrating processing executed by a client computer and by a server according to this embodiment.

FIG. 4 is a flowchart illustrating processing illustrated between the client computer 1 and server 30.

The Web home page of an image editing service provided by the server 30 is accessed by the user of the client computer 1 (step 41).

When the client computer 1 and the server 30 are connected, home-page data for service selection is transmitted from the server 30 to the client computer 1 in response to a request from the client computer 1 (step 51).

The home-page data for service selection transmitted from the server 30 is received by the client computer 1, whereupon the home page for service selection represented by the home-page data for service selection is displayed on the display screen of the display unit 14 of client computer 1 (step 42). The service utilized is selected by the user of the client computer 1. Here the user selects any service from among a "POSTCARD EDITING SERVICE", "BUSINESS CARD EDITING SERVICE" and "POSTER EDITING SERVICE" (step 43).

If the user selects a service, data indicative of the selected service and client information are transmitted to the server 30 (step 44).

Figure 5:
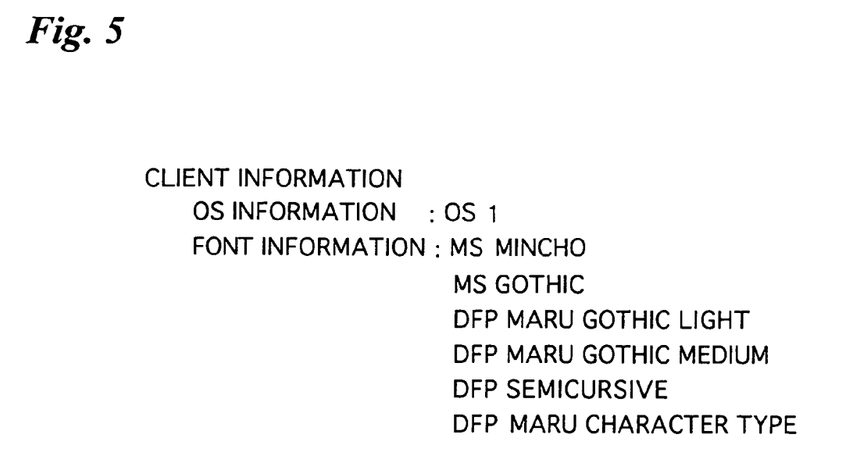
FIG. 5 illustrates client information according to this embodiment.

FIG. 5 illustrates the client information.

The client information includes OS information indicative of the OS of client computer 1, and font information indicative of fonts usable at the client computer 1.

Figure 6:
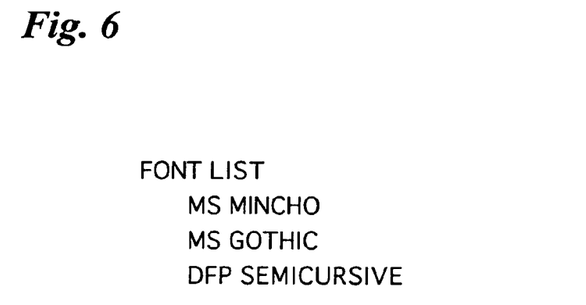
FIG. 6 illustrates a font list according to this embodiment.

With reference again to FIG. 4, the selected service and client information transmitted from the client computer 1 are received by the server 30. The latter executes processing for creating a font list (see FIG. 6) indicating the fonts that can be utilized in image editing processing at the client computer 1 (step 52). The processing for creating this font list will be described later in detail. The data representing the font list created by the font list creation processing and data representing the editing home page for carrying out the service selected by the user of the client computer 1 is transmitted from the server 30 to the client computer 1 (step 53).

When the editing home-page data and font-list data transmitted from the server 30 is received by the client computer 1, the editing home page is displayed on the display screen of the display unit 14 of client computer 1 (step 45).

Figure 7:
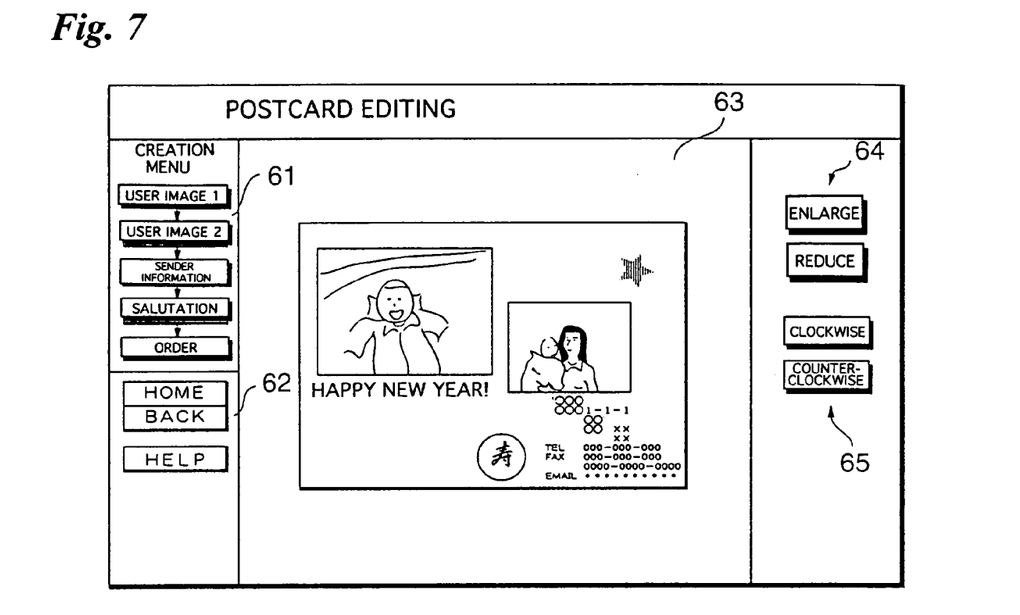
FIGS. 7 and 8 illustrate examples of windows displayed on a display unit of a client computer according to this embodiment.

FIG. 7 illustrates an example of the editing home page.

Here it is assumed that the user of the client computer 1 has selected the "POSTCARD EDITING SERVICE". Naturally, when the user of the client computer 1 selects another service, an editing home page corresponding to the selected service is displayed.

The editing home page includes the following areas:

Creation Menu Area 61

This is an area which displays the sequence through which a postcard is created. The following buttons (areas) are formed in this area:

"USER IMAGE 1": This is an area clicked by the user when a first frame of a user image to be combined with a postcard template is selected.

"USER IMAGE 2": This is an area clicked by the user when a second frame of a user image to be combined with the postcard template is selected.

"SENDER INFORMATION": This is an area clicked by the user when user information (name and address, etc.) is entered.

"SALUTATION": This is an area clicked by the user when text to be inserted into a postcard is entered.

"ORDER": This is an area clicked by the user when a postcard is ordered.

Assistance Area 62

This is an area for assisting postcard creation. This area includes a "HOME" area clicked by the user to return to the page initially displayed when the server 30 was accessed, a "BACK" area clicked by the user to return to the previous page and a "HELP" area clicked by the user when a help function is utilized.

Editing Image Display Area 63

This is an area for displaying the image being edited by the user.

Enlarge/Reduce Area 64

This is an area clicked by the user when a user image is enlarged or reduced in size.

Rotate Area 65

This is an area clicked by the user when a user image is to be rotated.

The user utilizes the editing home page to combine a desired user image with a template to perform image editing. When an image is combined with a template, "SALUTATION" in area 61 is clicked by the user. When this is done, a salutation input dialog box shown in FIG. 8 appears on the display screen of the display unit 14 of client computer 1.

Figure 8:
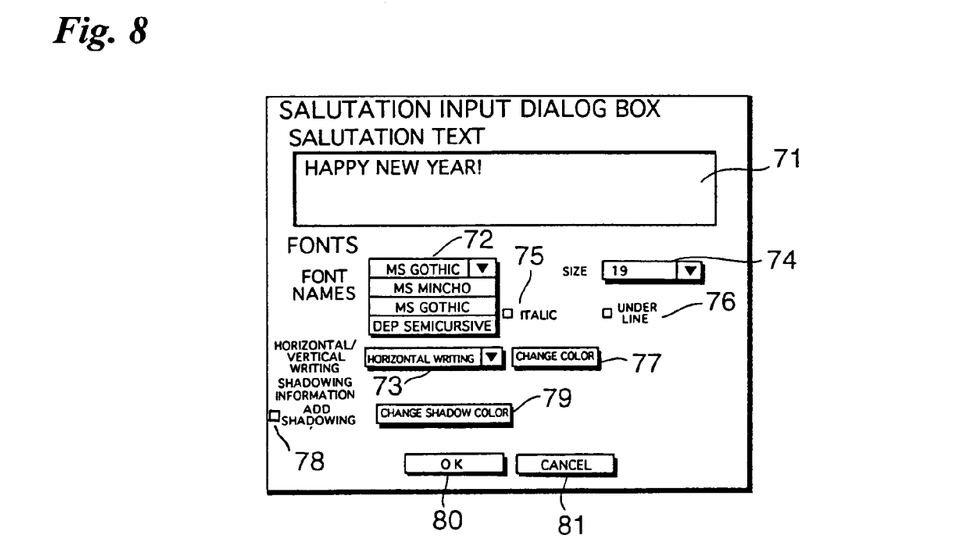

The salutation input dialog box includes the following areas:

Salutation Text Display Area 71

This is an area in which text entered by the user is displayed.

Font Name Display Area 72

This is an area for displaying a user-selected font from among the fonts contained in the font list that has been transmitted from the server 30.

Vertical/Horizontal Writing Designation Area 73

This is an area for designating whether entered text is to be written vertically or horizontally.

Size Designation Area 74

This is an area for designating the size of entered text.

Italic Designation Area 75

This is an area checked by the user when entered text is to be italicized.

Underline Designation Area 76

This is an area checked by the user when entered text is to be underlined.

Color-Change Designation Area 77

This is an area clicked by the user when the color of entered text is to be changed.

Shadowing Designation Area 78

This is an area checked by the user when entered text is to be shadowed.

Shadowing Color-Change Designation Area 79

This is an area checked by the user when the color of shadowing of entered text is to be changed.

OK Area 80

This is an area clicked by the user when entered text is to be inserted as a salutation.

Cancel Area 81

This is an area clicked by the user when entered information such as a salutation is to be canceled.

If text is entered by the user and the user clicks the OK area 80, the dialog box for input of the salutation vanishes. The text that has been entered is inserted into the edited image (which is displayed in the editing image display area 63) at the prescribed location thereof.

Figure 9:
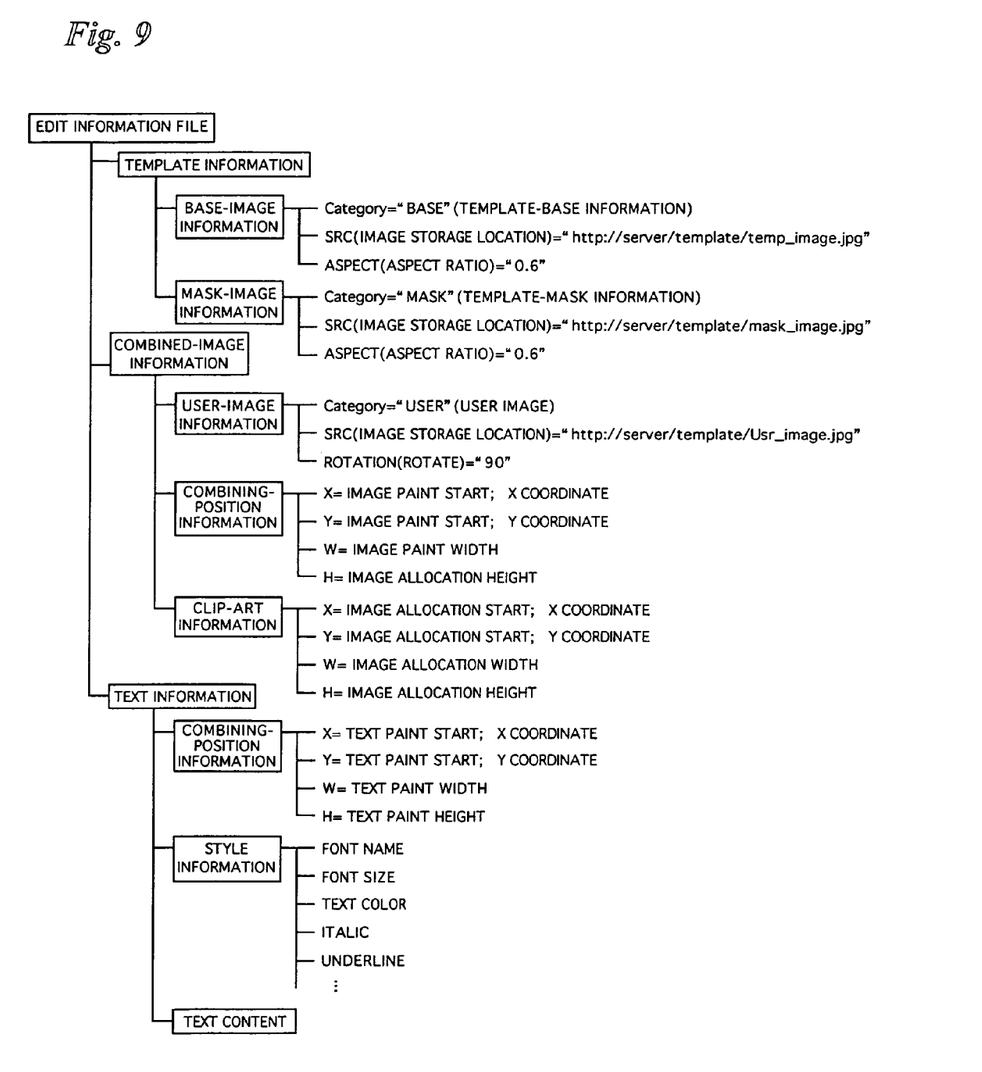
FIG. 9 illustrates an edit information file according to this embodiment.

FIG. 9 illustrates an edit information file generated in response to editing of an image by the user.

The edit information file includes template information, combined-image information and text information.

The template information is information regarding the template that constitutes the edited image and includes base-image information and mask-image information.

The base-image information is information regarding the background image of the template image and contains data representing category, image storage location and aspect ratio.

The mask-image information is information which stipulates an area in the template image for combining the user image and contains data representing category, image storage location and aspect ratio.

The combined-image information contains the user-image information, combining-position information and clip-art information.

The user-image information is information regarding the user image to be combined with the template and contains a category, image-storage location and degree of rotation.

The combining-position information is information indicating the position at which the user image is to be combined and contains X and Y coordinates representing the starting point for painting of the user image, as well as paint height and width of the user image.

The clip-art information is information regarding clip art inserted into the edited image and contains X and Y coordinates representing the starting point for painting of the clip-art image, as well as paint height and width of the clip-art image.

The text information includes combining-position information, style information and text content.

The combining-position information contains X and Y coordinates representing the starting point for painting of text, as well as paint height and width of the text.

The style information contains information entered by the salutation input dialog box, such as the font name, font size, text color, whether italic characters are to be used and whether underlining is to be performed, as selected by the user.

The content of text contains the text that has been entered by the salutation input dialog box.

Thus, by editing an image on the editing home page, such an edit information file is generated.

With reference again to FIG. 4, the "ORDER" area in the creation menu area on the editing home page is clicked by the user if image editing processing has been completed (step 46). This acts as a print request (step 47). The user image used in the image edited by the user and the edit information file that has been created are transmitted from the client computer 1 to the server 30.

Upon receiving the user information and edited image file transmitted from the client computer 1, the server 30 edits an image, which is identical with the information edited by the user of the client computer 1, based upon the items of information that have been stored in the edited image file (step 54). The text that has been entered by the user also is inserted in the edited image using the designated font. Since the font that has been designated by the user is one usable at the client computer 1 and at the server 30, the server 30 is capable of printing the edited image using the font employed by the user of the client computer 1 (step 55).

The edited image that has been printed is delivered as by mail to the residence of the user of client computer 1.

Figure 10:
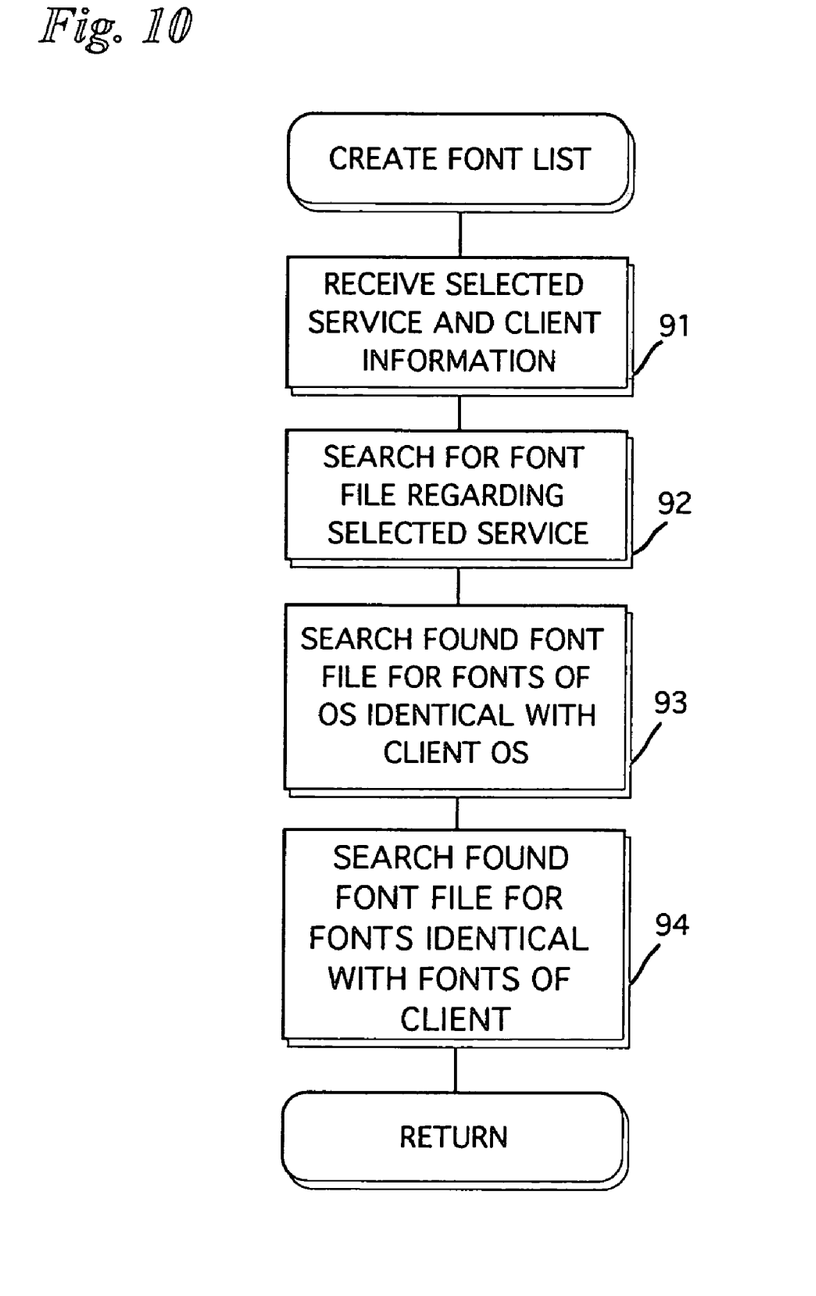
FIG. 10 is a flowchart illustrating processing for creating a font list according to this embodiment.

FIG. 10 is a flowchart illustrating processing for creating the font list. This processing corresponds to the processing of step 52 in FIG. 4.

When data representing a service and client information transmitted from the client computer 1 are received by the server 30 (step 91), reference is had to the menu file of the server 30 and a search is conducted for the font file corresponding to the service that has been selected by the user of the client computer 1 (step 92). For example, if the service that has been selected by the user is the "POSTCARD CREATION" service, then Font File 1 is found.

When the font file corresponding to the service is found, then this font file is searched for the font names grouped under an OS identical with the OS representing the OS information contained in the client information (step 93). If the OS information indicates OS 1, then the font file is searched for "MS GOTHIC, MS MINCHO, DFP SEMICURSIVE, DFP BLOCK MEDIUM" grouped under OS 1.

Furthermore, the font names found are searched for fonts that are the same as those represented by the font information that has been transmitted from the client computer 1 (step 94). For example, if the font information that has been transmitted from the client computer 1 is as shown in FIG. 5, then "MS GOTHIC, MS MINCHO and DFP SEMICURSIVE" are eventually found.

The fonts thus found constitute the font list, which is then transmitted from the server 30 to the client computer 1.

FIGS. 11 to 14 illustrate examples of windows displayed on the display unit of the server 30. These windows will be referred to in order to describe processing for registering fonts with the server 30.

Figure 11:
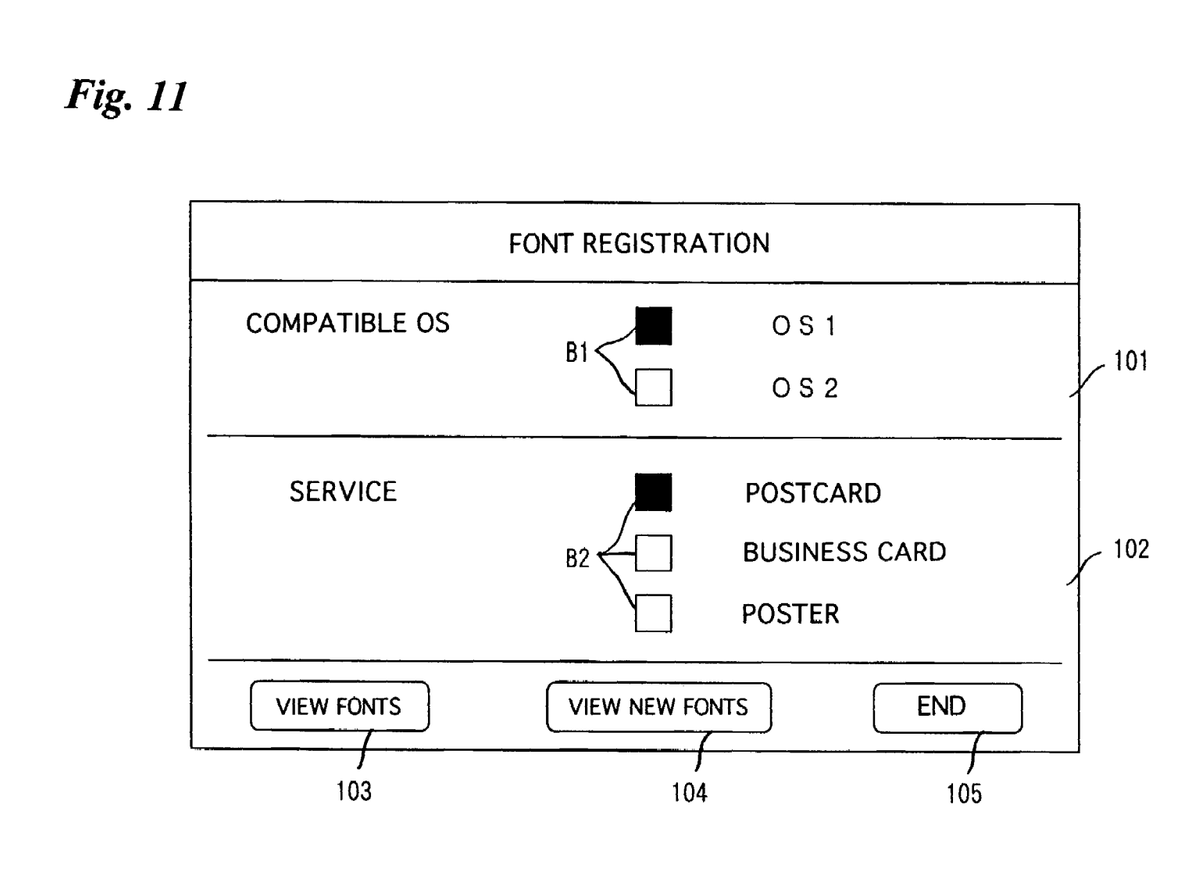
FIGS. 11 to 14 illustrate examples of windows displayed on a display unit of the server according to this embodiment.

When a font registration mode is established, a font registration window illustrated in FIG. 11 appears on the display unit of the server 30.

The font registration window includes the following areas:

Compatible OS Setting Area 101

This is an area in which an OS compatible with the registered fonts is selected by a check box B1.

Service Setting Area 102

This is an area in which a service suited to use of the registered fonts is set by a check box B2.

Font View Area 103

Figure 12:
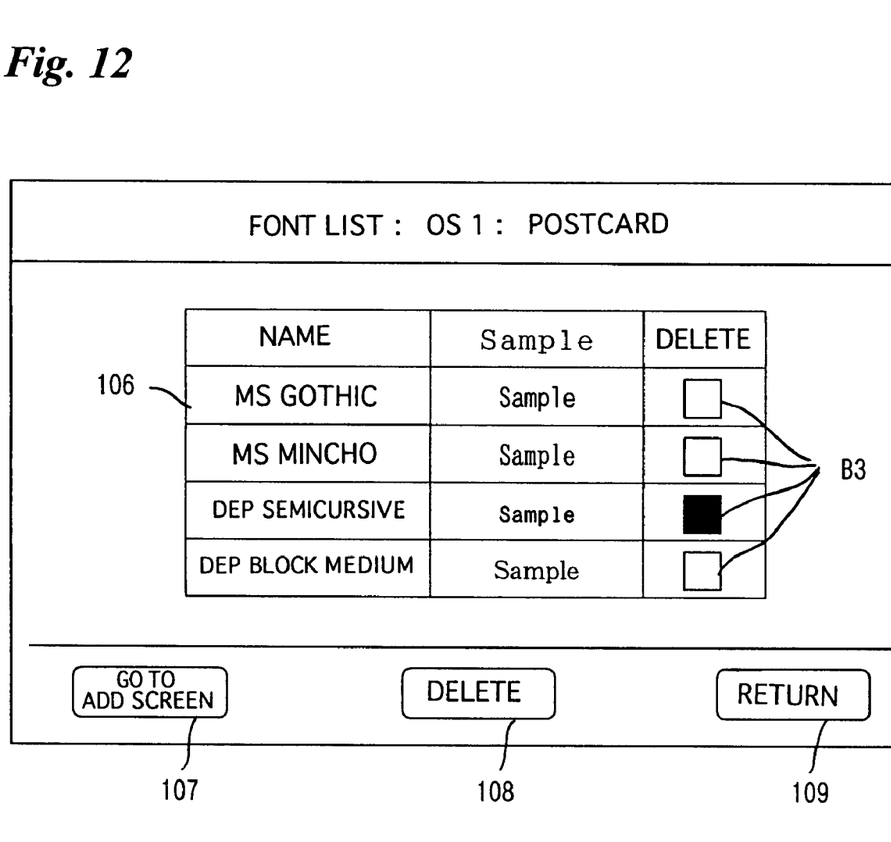

By clicking this area after an OS and service have been selected, a font viewing window shown in FIG. 12 appears.

New-Font View Area 104

Figure 14:
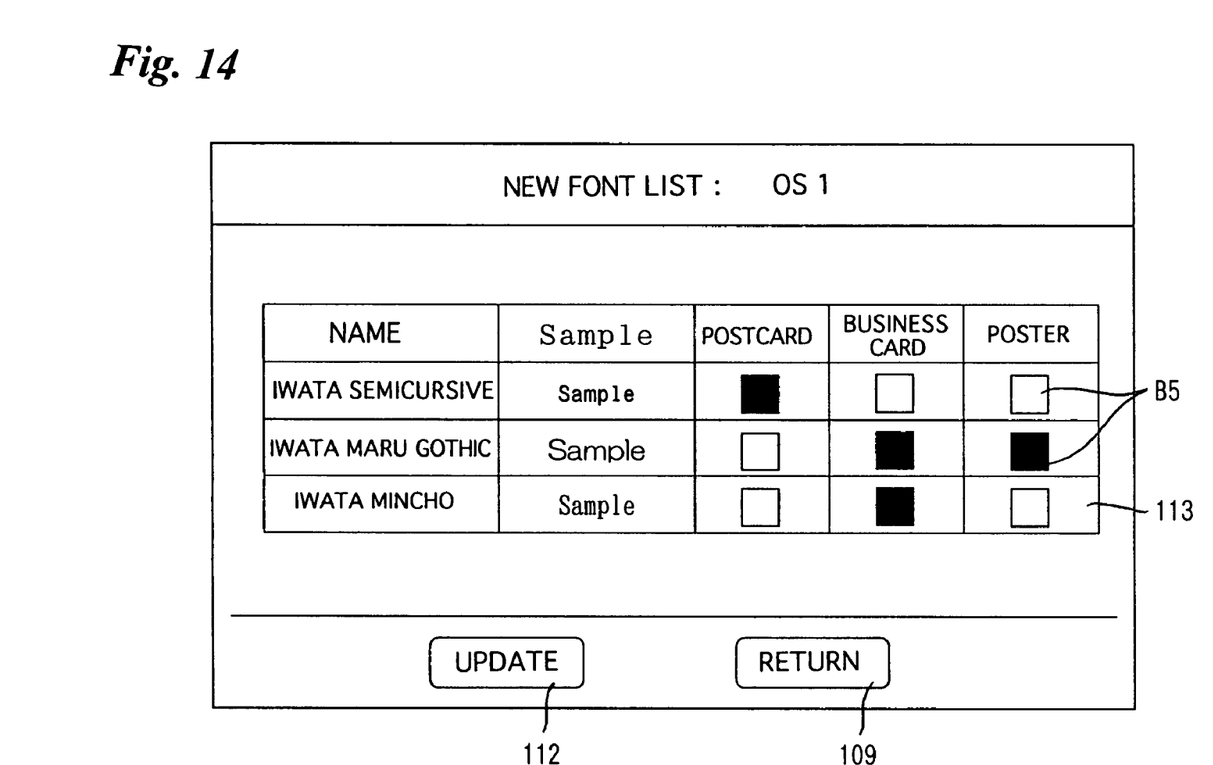

By clicking this area, a new-font list window shown in FIG. 14 appears.

End Area 105

This is an area clicked by the user when font registration processing is to be exited.

As shown in FIG. 12, the fonts that can be utilized by the OS and service that have been set in the font registration window are displayed in list form in the font viewing window in an area 106 for each sample name and font sample. Further, check boxes B3 also are displayed in association with the names of the fonts. It goes without saying that the menu file and font files already stored in the server 30 are utilized.

Figure 13:
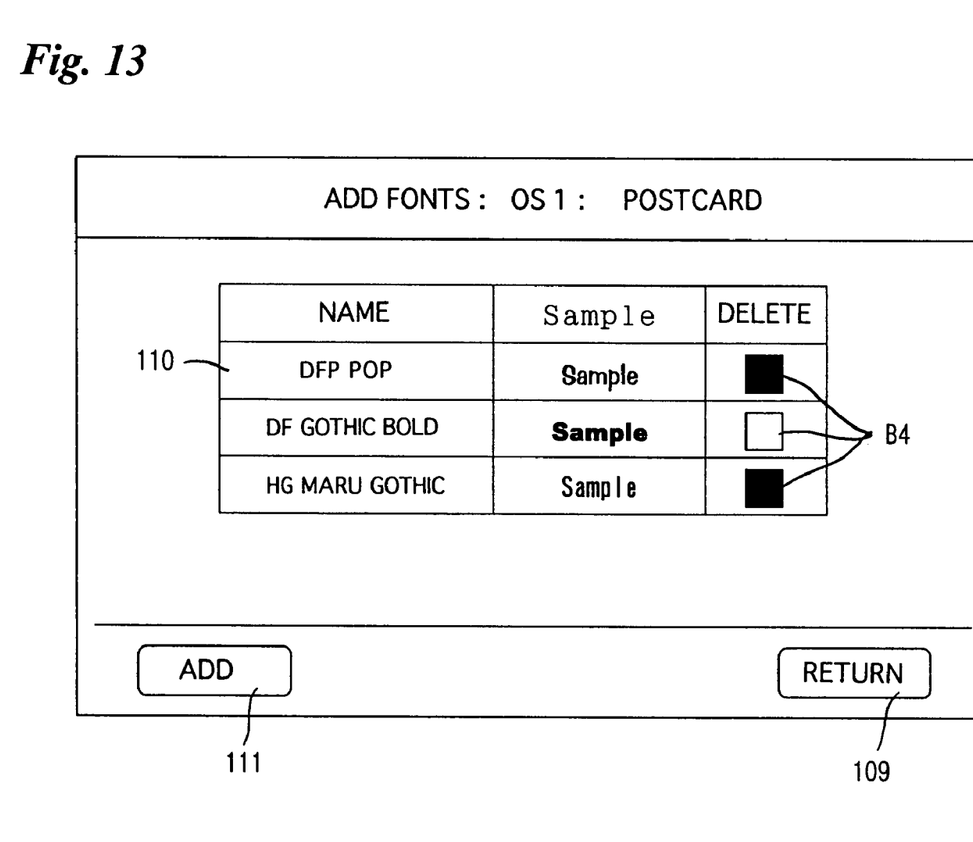

The font viewing window includes an add area 107, a delete area 108 and a back area 109. If the add area 107 is clicked, a font addition window shown in FIG. 13 is displayed on the display unit. If the delete area 108 is clicked, this causes deletion of the font whose check bock B3 included in area 106 has been checked. As a result, this font is deleted from the corresponding font file. If the back area 109 is clicked, the font registration window shown in FIG. 11 is displayed.

As shown in FIG. 13, the names of fonts not utilized by the OS and service that have been set in the font registration window are displayed in the form of a list in an area 100 thereof in the font addition window. These fonts are among those stored in the server 30. This list of fonts can be created using Font File 0 and Font Files 1 to 3. When addition is to be performed, a check box B4 corresponding to the font name to be added is checked.

The font addition window further includes an add area 111 and the back area 109. Clicking the add area 1111 causes the font name whose check box B4 has been checked to be stored in the font file of the corresponding service as a font suited to the OS and service that have been set. If the back area 109 is checked, the font viewing window shown in FIG. 12 is displayed.

As shown in FIG. 14, fonts that have not been registered for services are displayed in a new-font viewing window in a display area 113 thereof in the form of a list. The new-font viewing window includes an update area 112 and the back area 109.

Clicking the update area 112 causes the font files to be reconstituted in such a manner that the fonts of font names whose check boxes B5 have been checked will be utilized in the particular service. The font registration window is returned to by clicking the back area 109.

As many apparently widely different embodiments of the present invention can be made without departing from the spirit and scope thereof, it is to be understood that the invention is not limited to the specific embodiments thereof except as defined in the appended claims.

What is claimed is:

1. A data communication system comprising:
    a client computer and a server being capable of communicating data with each other, wherein said client computer includes a first font transmitting unit for transmitting font information data representing fonts which are stored on said client computer and capable of being output at said client computer; and wherein said server comprises:

a first receiving unit for receiving the font information data that has been transmitted from said first font transmitting unit of said client computer;

a font search unit for searching for fonts, which are stored on said client computer and capable of being output at said client computer, from among fonts capable of being output at said server, on the basis of fonts represented by the font information data that has been received by said first receiving unit; and a second font transmitting unit for transmitting font information data representing the fonts, which have been found by said font search unit, to said client computer, wherein said client computer further comprises a font name display device that displays a font name represented by the font information data transmitted from said second font transmitting unit of said server, and wherein said second font transmitting unit transmits said font information data representing the fonts, which have been found by said font search unit, to said client computer for display by said font name display device of said client computer to a user such that said user can selectively create documents using said fonts which have been determined to be stored on said client computer, which have been determined to be capable of being output at said client computer, and which have been determined to be capable of being output at said server.

2. The system according to claim 1, wherein said client computer further includes an operating-system transmitting unit for transmitting operating-system data, which represents an operating system of said client computer to said server; and wherein said server further includes an operating-system data receiving unit for receiving the operating-system data transmitted from said operating-system data transmitting unit of said client computer;

said font search unit searching for fonts, which are capable of being output at said client computer, on the basis of the operating system represented by the operating-system data that has been received by said operating-system data receiving unit and the fonts represented by the font information data that has been received by said first receiving unit.

3. The system according to claim 2, wherein said server further includes a first reporting unit for reporting fonts, which are capable of being output, in association with an operating system.

4. The system according to claim 2, wherein said operating-system data comprises a type of document being created by the client computer.

5. The system according to claim 1, wherein said client computer further comprises:

a selection unit for selecting a type of document to be created; and a selection-data transmitting unit for transmitting selection data, which represents the type of document selected by said selection unit, to said server; and said server further includes a selection-data receiving unit for receiving the document selection data that has been transmitted from said client computer;

said font search unit searching for fonts, which are capable of being output at said client computer, on the basis of the type of document represented by the selection data that has been received by said selection-data receiving unit and the font information data that has been received by said first receiving unit.

6. The system according to claim 5, wherein said server further includes a second reporting unit for reporting fonts, which are capable of being output, in association with the type of document.

7. The system according to claim 1, wherein said client computer further comprises:

a font determination unit that determines a font used in an edited image from among the font information data transmitted from said second font transmitting unit of said server; and image editing means for editing an image using a font determined by said font determination unit.

8. The system according to claim 1, wherein a printing quality of the server is greater than that of a printing quality of the client computer.

9. The system according to claim 1, wherein a storage capacity of the server is larger than that of a storage capacity of the client computer.

10. The system according to claim 1, further comprising a printer attached to said server.

11. The system according to claim 10, wherein said font information data, including fonts capable of being output from said server and capable of being output at said client computer, comprises fonts capable of being printed by said printer.

12. The system according to claim 1, wherein said font information data representing said fonts which are stored on said client computer and capable of being output at said client computer, comprises:

a list of names of said fonts which are stored on said client computer and which are capable of being output at said client computer.

13. The system according to claim 1, wherein said font information data representing the fonts, which have been found by said font search unit, comprises:

a list of names of said fonts which are stored on said client computer and which are capable of being output at said client computer, and which match names of fonts which have been found by said font search unit to be capable of being output at said server.

14. The system according to claim 1, wherein said font search unit compares said fonts, which are stored on said client computer and capable of being output at said client computer, with said fonts, which are capable of being output at said server.

15. The system according to claim 14, wherein said font search unit matches at least one of said fonts, which are stored on said client computer and capable of being output at said client computer, with a font of said fonts, which are capable of being output at said server.

16. The system according to claim 14, wherein said font search unit selectively determines which fonts of said fonts, which are stored on said client computer and capable of being output at said client computer, are capable of being output at said server.

17. The system according to claim 1, wherein said font search unit compares and contrasts said fonts, which are stored on said client computer and capable of being output at said client computer, with said fonts, which are capable of being output at said server, and wherein said font search unit identifies said fonts, which are stored on said client computer and capable of being output at said client computer, which are capable of being output at said server.

18. The system according to claim 1, wherein said font information data representing the fonts, which have been found by said font search unit, comprises:
a list of names of said fonts, which are stored on said client computer and which are capable of being output at said client computer, and which match names of said fonts which are capable of being output at said server, and
wherein said font search unit generates said list of names of said fonts.

19. The system according to claim 18, wherein said font search unit generates said list of names of said fonts based on at least one of an operating system of said client computer, a service selected by said client computer, and client information of said client computer.

20. A client computer capable of communicating data with a server,
wherein:
font information data representing fonts which are stored on said client computer and capable of being output at said client computer are transmitted from said client computer to said server;
said server searches fonts capable of being output at said server for fonts which are stored on said client computer and capable of being output at said client computer based upon fonts represented by the font information data that has been transmitted from said client computer, and transmits font information data representing the fonts that have been found to said client computer; and
said client computer comprises:
a receiving unit for receiving font information data that has been transmitted from said server;
a reporting unit for reporting fonts represented by the font information data that has been received by said receiving unit, and
a font name display device that displays a font name represented by the font information data transmitted from said second font transmitting unit of said server,
wherein said receiving unit receives said font information data representing the fonts, which have been found by said server, from said server for display by said font name display device of said client computer to a user such that said user can selectively create documents using said fonts which have been determined to be stored on said client computer, which have been determined to be capable of being output at said client computer, and which have been determined to be capable of being output at said server.

21. A server capable of communicating data with a client computer, comprising:
a receiving unit for receiving font information data transmitted from said client computer and representing fonts which are stored on said client computer and capable of being output at said client computer;
a search unit for searching for fonts, which are capable of being output at said client computer, from among fonts capable of being output at said server, on the basis of fonts represented by the font information data that has been received by said first receiving unit; and a transmitting unit for transmitting font information data, which represents fonts that have been found by said search unit, to said client computer,
wherein said font information data includes a font name represented by the font information data transmitted from said server which is stored on said client computer, which has been determined to be capable of being output at said client computer, and which has been determined to be capable of being output at said server, and
wherein said transmitting unit transmits said font information data representing the fonts, which have been found by said search unit, to said client computer for display by a font name display device of said client computer to a user such that said user can selectively create documents using said fonts which have been determined to be stored on said client computer, which have been determined to be capable of being output at said client computer, and which have been determined to be capable of being output at said server.

22. A method of controlling a server which communicates data with a client computer, comprising:
receiving font information data that has been transmitted from the client computer and that represents fonts which are stored on said client computer and capable of being output at said client computer;
searching for fonts, which are stored on said client computer and capable of being output at the client computer, from among fonts capable of being output at the server, on the basis of fonts represented by the font information data that has been received;
transmitting font information data representing the fonts that have been found by said searching to the client computer, and
displaying a font name represented by the font information data that is received by the client computer to a user such that said user can selectively create documents using said fonts which have been determined to be stored on said client computer, which have been determined to be capable of being output at said client computer, and which have been determined to be capable of being output at said server.

23. A computer-readable recording medium storing a program for controlling a client computer capable of communicating with a server, wherein the client computer transmits font information data representing fonts which are stored on said client computer and capable of being output at said client computer to the server, said server searches fonts capable of being output at said server for fonts which are stored on said client computer and capable of being output at said client computer based upon fonts represented by the font information data that has been transmitted from said client computer, and transmits font information data representing the fonts that have been found to said client computer;
said program controlling the client computer so as to:
receive font information data that has been transmitted from said server;
report fonts represented by the font information data that has been received, and
display, on a font name display device of said client computer, a font name represented by the font information data transmitted from said server,
wherein said server transmits said font information data representing the fonts, which have been found by said server, to said client computer for display by said font name display device of said client computer to a user such that said user can selectively create documents using said fonts which have been determined to be stored on said client computer, which have been determined to be capable of being output at said client computer, and which have been determined to be capable of being output at said server.

24. A data communication system comprising:

means for communicating data between a client computer and a server, wherein said client computer comprises means for transmitting font information data including fonts which are stored on said client computer and capable of being output at said client computer; and wherein said server comprises:

means for receiving the font information data transmitted from said means for transmitting;

means for searching for fonts, which are stored on said client computer and capable of being output at said client computer, from among fonts capable of being output at said server, on the basis of the font information data received by said means for receiving; and second means for transmitting font information data, including the fonts that have been identified by said means for searching, to said client computer, wherein said client computer further comprises means for displaying a font name represented by the font information data transmitted from said means for transmitting font information data which is stored on said client computer, which has been determined to be capable of being output at said client computer, and which has been determined to be capable of being output at said server, and wherein said second means for transmitting transmits said font information data representing the fonts, which have been found by said search unit, to said client computer for display by said means for displaying to a user such that said user can selectively create documents using said fonts which have been determined to be stored on said client computer, which have been determined to be capable of being output at said client computer, and which have been determined to be capable of being output at said server.

25. A data communication system comprising:

a client computer; and a server in communication with said client computer;

wherein said client computer comprises:

a first font transmitting unit that transmits a first font information data, including fonts which are stored on said client computer and capable of being output at said client computer, to said server; and a first receiving unit that receives a second font information data from said server; and wherein said server comprises:

a second receiving unit for receiving the first font information data transmitted from said first font transmitting unit of said client computer;

a second font transmitting unit that transmits the second font information data from said server to said client computer; and means for ensuring that a font which are stored on the client computer and employed by the client computer is capable of being output by the server, wherein said client computer further comprises a font name display device that displays a font name represented by the font information data transmitted from said second font transmitting unit of said server, and wherein said second font transmitting unit transmits said font information data representing the fonts, which have been found by said font search unit, to said client computer for display by said font name display device of said client computer to a user such that said user can selectively create documents using said fonts which have been determined to be stored on said client computer, which have been determined to be capable of being output at said client computer, and which have been determined to be capable of being output at said server.

26. The system according to claim 25, wherein said means for ensuring comprises:

a font search unit that searches for fonts capable of being output at said client computer and capable of being output at said server, based on the first font information data received from said client computer by said first receiving unit, and generates said second font information data comprising fonts capable of being output at said client computer and capable of being output at said server.

27. The system according to claim 26, further comprising a printer attached to said server, said printer capable of printing fonts output from said server.

28. The system according to claim 26, wherein said font information data, including fonts capable of being output from said server and capable of being output at said client computer, comprises fonts capable of being printed by a printer of the server.

* * * * *